(Model.)
J. CHANTRELL.
SASH FASTENER.
No. 359,058. Patented Mar. 8, 1887.
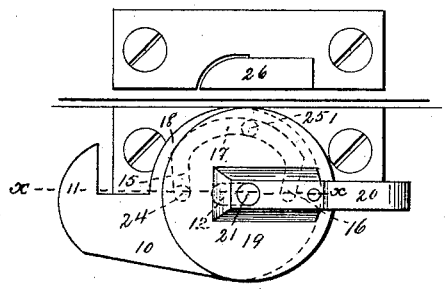
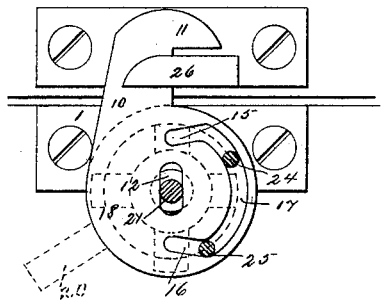
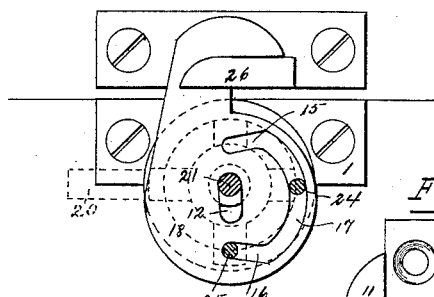
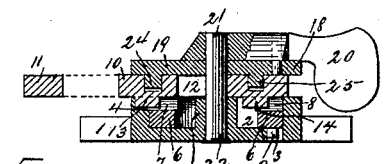
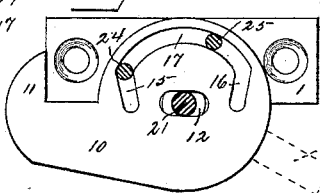
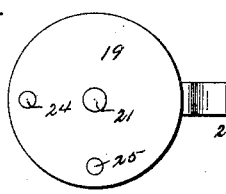
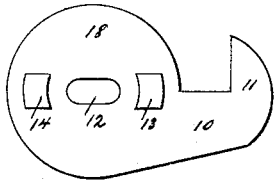
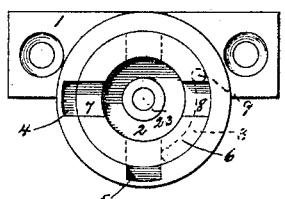
Witnesses
E. D. Smith
C. E. Ruggles
Inventor
John Chantrell
By
F. M. Wooster
Atty.
N. PETERS, Photo-Lithographer, Washington, D. C.

UNITED STATES PATENT OFFICE.

JOHN CHANTRELL, OF READING, PENNSYLVANIA, ASSIGNOR TO THE READING HARDWARE COMPANY, OF SAME PLACE.

SASH-FASTENER.

SPECIFICATION forming part of Letters Patent No. 359,058, dated March 8, 1887.

Application filed January 14, 1887. Serial No. 224,318. (Model.)

*To all whom it may concern:*

Be it known that I, JOHN CHANTRELL, a citizen of the United States, residing at Reading, in the county of Berks and State of Pennsylvania, have invented certain new and useful Improvements in Locks for Meeting-Rails of Sashes; and I do hereby declare the following to be a full, clear, and exact description of the invention, such as will enable others skilled in the art to which it appertains to make and use the same.

My invention relates to the class of fastenings for meeting-rails of sashes in which a swinging catch or lever pivoted to one of the rails engages a stump upon the other rail. In the present instance I have shown the swinging catch or lever as placed upon the upper rail of the lower sash, and the stump as placed upon the lower rail of the upper sash.

My invention has for its object to simplify and strengthen the construction, and to greatly improve the mode of operation of this class of devices, while at the same time the cost of production shall be reduced to the minimum.

With these ends in view I have devised the novel construction which I will now describe, referring by numbers to the accompanying drawings, forming part of this specification, in which—

Figure 1 is a plan view of the device complete, the catch being shown as locked in the disengaged position; Fig. 2, a plan view, the operating-plate being removed, showing the catch or lever as thrown to the engaged position, but not drawn inward; Fig. 3, a plan view corresponding with Fig. 2, showing the catch engaged and drawn inward to bring the meeting-rails in contact with each other; Fig. 4, a section on the line $x\ x$ in Fig. 1; Fig. 5, a plan view corresponding substantially with Fig. 1, showing the position of the parts the instant before the catch or lever is thrown outward and locked in the disengaged position; Fig. 6, an inverted plan view of the operating-plate detached; Fig. 7, an inverted plan view of the catch or lever; and Fig. 8 is a plan view of the base-plate, showing the slotted ring lying in the socket.

1 denotes the base-plate having a socket, 2, a curved slot, 3, in the bottom of said socket at the edge, and notches 4 and 5 in the rim thereof, the purposes of which will presently be explained.

6 denotes a ring lying in said socket, the upper edge of said ring being flush with the rim of the socket, and the upper side thereof provided with slots 7 and 8, the former of which is in line with notch 4 when the parts are in the disengaged position, and the latter in line with notch 5 when the parts are in the engaged position, as will be more fully explained.

9 is a pin on the under side of said ring, adapted to engage slot 3, whereby the throw of the catch in both directions is limited.

10 denotes the catch or lever, which is provided with a hook or projection, 11, to engage the stump and a central slot, 12.

13 and 14 are lugs on the under side of catch 10, which engage slots 7 and 8 in the ring, the former being adapted to engage notch 4, to lock the catch in the disengaged position, and the latter to engage notch 5, to lock the catch in the engaged position, as will be more fully explained.

15 and 16 denote inclined slots in enlargement 18 of the catch, said slots being connected by a curved slot, 17.

19 denotes the operating-plate, the body of which is preferably of the same diameter as enlargement 18 of the catch and the rim of the socket upon the base-plate. This plate is provided with a handle or thumb-piece, 20, which may be placed directly above it or at one side, as shown in the drawings.

21 denotes a central stud on the under side of the operating-plate, which passes down through slot 12 in the catch and through the base-plate, being headed on the under side thereof, as shown at 22.

23 denotes a central boss projecting upward from the bottom of the base-plate, having an opening, through which the stud passes, this boss being preferably provided to give additional bearing to the stud.

24 and 25 denote pins on the under side of the operating-plate which engage slots 15, 16, and 17 in the enlargement of the catch, pin 24 being adapted to engage the end of slot 15 when the catch is locked in the disengaged position, and pin 25 to engage the end of slot 16, when the catch is locked in the engaged position.

The operation is as follows: Suppose the parts to be locked in the disengaged position, as shown in Fig. 1. Pin 24, on the under side of the operating-plate, is lying at the end of slot 15 in the enlargement of the catch. Pin 9, on the under side of the ring, is at one end of slot 3, to limit the throw of the lever in that direction, and lug 13, on the under side of the catch, is in engagement with notch 4 in the rim of the socket to lock the lever in its disengaged position. Starting, now, to move the operating-handle around from right to left, the first action is to cause pin 24 to travel up the inclined slot 15, which acts to draw the catch inward until the pin has passed into curved slot 17, at the same time drawing lug 13 inward out of notch 4, and leaving it in engagement with slot 7 in the ring. By the time pin 24 has passed into curved slot 17 pin 25 will have passed to the other end of said slot and will be in engagement with the straight wall of inclined slot 16. Continued movement of the handle around toward the right swings the catch, and with it the ring, through the engagement of lug 13 with slot 7, toward the right until pin on the under side of the ring shall have reached the opposite extremity of slot 3 in the bottom of the socket. The parts will then be in the position shown in Fig. 2. Continued movement of the handle toward the left causes pin 25 to ride up the inclined slot 16, thus acting to draw the catch inward against the stump and bring the two meeting-rails of the sashes together, as clearly shown in Fig. 3. At the same time stud 14 on the under side of the catch will pass into notch 5 in the rim of the socket, thus locking the lever in its engaged position. The movement to throw the catch to the disengaged position is exactly the reverse of that just described. Backward movement of the handle around toward the right first throws the parts to the position shown in Fig. 2. This disengages stud 14 from notch 5, and leaves both catch and ring free to be turned backward toward the left by the continued movement of the handle. When the catch and handle have reached the position indicated in Fig. 5, pin 24 will be at the end of slot 17. Continued movement of the handle toward the right forces pin 24 up the inclined slot 15, and throws the catch outward to the position shown in Fig. 1, at the same time causing lug 13 to engage notch 4 in the rim of the socket, so that the catch is locked in the disengaged position. The act of assembling consists simply in placing the parts in the positions described, passing the central stud through the slot in the catch and through the base-plate, and heading it on the under side thereof, as is clearly shown.

I do not desire to limit myself to the exact details of construction shown and described, as it is obvious that they may be varied within reasonable limits without departing from the spirit of my invention.

I claim—

1. In a fastener for meeting-rails of sashes, the base-plate having a socket and a ring slotted across the top lying in said socket, in combination with a catch having lugs on its under side adapted to engage the slots in the ring and slots in its upper side, as shown, and an operating-plate having pins on its under side adapted to engage the slots in the catch, so that rotation of the plate carries the catch to either the engaged or disengaged position.

2. In a fastener for meeting-rails of sashes, a base-plate having a socket and notches 4 and 5 in the rim thereof, and a ring having slots 7 and 8 lying in said socket, in combination with a catch having lugs on its under side adapted to engage said slots and notches and slots 15, 16, and 17 on its upper side, and an operating-plate having pins on its under side adapted to engage the slots in the catch, whereby rotation of the plate carries the catch to the engaged or disengaged position, and when in that position moves it radially in or out to lock it in such position.

3. The base-plate having a socket, a curved slot, 3, in the bottom of said socket, and notches in the rim thereof, and a ring lying in said socket provided with a pin engaging the slot, and slots across its top adapted to register with the notches, in combination with a catch having lugs on its under side adapted to engage the slots in the ring and the notches in the rim of the socket and slots 15, 16, and 17 in the upper side thereof, and an operating-plate having pins on its under side adapted to engage the slots in the catch, substantially as and for the purpose set forth.

4. The base-plate having a central boss and socket and notches in the rim thereof, and a ring slotted across its top lying in said socket, in combination with a catch having lugs adapted to engage said slots and notches, a central slot through it, and connected slots, as shown, on its upper side, and an operating-plate having a central stud which passes through the slot in the catch and the boss and is headed under the base-plate, and pins which engage the slots in the top of the catch, whereby the latter is operated.

In testimony whereof I affix my signature in presence of two witnesses.

JOHN CHANTRELL.

Witnesses:
W. S. SHENTON,
F. PIERCE HUMMEL.